W. F. KENNEY.
NUT.
APPLICATION FILED SEPT. 8, 1908.

932,396.

Patented Aug. 24, 1909.

WITNESSES.
Albert G. Piegenthowski.
Richard E. Lacy.

INVENTOR.
William F. Kenney,
per S. Scholfield,
ATTORNEY.

UNITED STATES PATENT OFFICE.

WILLIAM F. KENNEY, OF PROVIDENCE, RHODE ISLAND.

NUT.

932,396.  Specification of Letters Patent.  Patented Aug. 24, 1909.

Application filed September 8, 1908. Serial No. 452,147.

*To all whom it may concern:*

Be it known that I, WILLIAM F. KENNEY, a citizen of the United States, and resident of Providence, in the State of Rhode Island, have invented a new and useful Improvement in Nuts, of which the following is a specification.

The nature of my invention consists in an improved lock-nut in which the sides of the nut are adapted to act resiliently inward upon the threads of a bolt and thereby prevent the screwed up nut from becoming loose.

Figure 1:
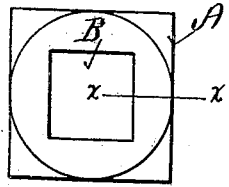
Figure 3:
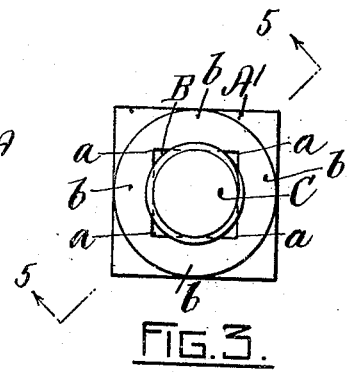
Figure 4:
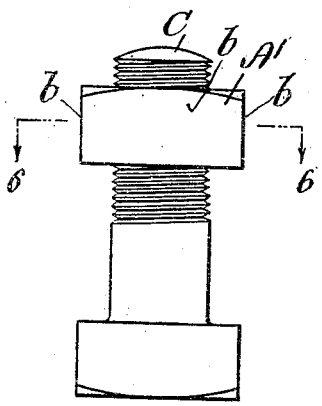
Figure 5:
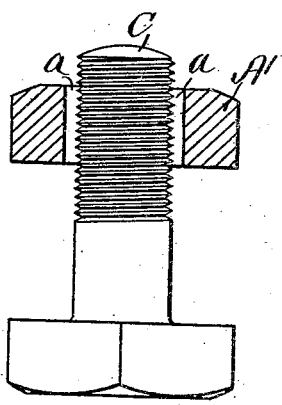
Figure 6:
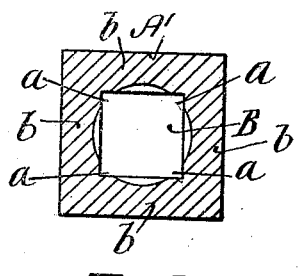
Figure 7:
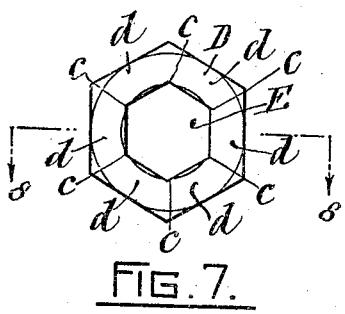
Figure 8:

In the accompanying drawings: Figure 1 represents a face view and Fig. 2 an edge view of a square nut-blank embodying my invention. Fig. 3 represents the face view of a completed square nut upon a bolt. Fig. 4 represents an edge view of the same. Fig. 5 represents a section taken in the line 5, 5, of Fig. 3. Fig. 6 represents a section of the nut taken in the line 6, 6, of Fig. 4 with the bolt removed. Fig. 7 represents the face view of a hexagonal nut embodying my invention. Fig. 8 represents a section taken in the line 8, 8, of Fig. 7.

In the drawing A, Fig. 1 represents a square nut-blank provided with the square perforation B, in which the required broken screw thread is to be cut to form the finished nut. The corners $a$, $a$, of the perforation B of the nut A' extend beyond the periphery of the bolt C, as shown in the nut and bolt Fig. 3 and also in the longitudinal section Fig. 5 so that the resilient side portions $b$, $b$, of the nut may be pressed outward by the greater diameter of the bolt C, thus causing a resilient pressure to be exerted between the threads of the bolt C and nut, to prevent the automatic reverse movement and loosening of the said nut when in use.

It is often very difficult to remove a nut which through the lapse of time and exposure to the weather has become rusted to the bolt but with my improved nut, the material applied to loosen the rust will have ready access to the threads.

An hexagonal nut D embodying my invention is shown in Fig. 7, in which the corners $c$, $c$, of the hexagonal perforation E, will extend outward beyond the periphery of an inclosed bolt, and in this case the side portions $d$, $d$, of the nut may be caused to act resiliently upon the threads of the inclosed bolt as in the case of the square nut A'.

Figure 2:
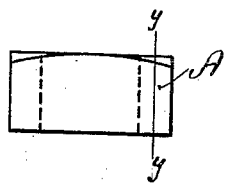

In order to secure the desired proportion and degree of resilience, it is necessary that the radial dimension of a section taken through the middle of one of the sides of the nut, as in the line $x$, $x$, of Fig. 1, shall be less than the axial dimension of the same section as indicated by the line $y$ $y$, of Fig. 2.

I claim as my invention:

1. A radially resilient nut, having its central perforation elongated radially, in the direction of the corners of the nut, beyond the periphery of the bolt upon which it is to be used, and having its sides adapted to yield to a bolt of larger diameter than the threaded bore of the nut, and to contract resiliently to its normal diameter upon removal therefrom.

2. The combination of a nut having its central perforation elongated radially, in the direction of the corners of the nut beyond the periphery of the bolt upon which it is to be used, and having its sides adapted to yield to a bolt of larger diameter than the threaded bore of the nut and to contract resiliently to its normal diameter upon removal therefrom, with a bolt of larger diameter than the said threaded bore of the nut, whereby the threads of the bolt and nut will be so held in contact with each other by the radial resiliency of the sides of the nut as to prevent accidental loosening of the nut from its seat.

WILLIAM F. KENNEY.

Witnesses:
  SOCRATES SCHOLFIELD,
  BENJAMIN L. DENNIS.